United States Patent
Kawaguchi

(10) Patent No.: US 11,853,099 B2
(45) Date of Patent: Dec. 26, 2023

(54) RECOVERY METHOD OF REMOTE COPY

(71) Applicant: Hitachi, Ltd., Tokyo (JP)

(72) Inventor: Tomohiro Kawaguchi, Santa Clara, CA (US)

(73) Assignee: HITACHI, LTD, Tokyo (JP)

(*) Notice: Subject to any disclaimer, the term of this patent is extended or adjusted under 35 U.S.C. 154(b) by 100 days.

(21) Appl. No.: 17/743,081

(22) Filed: May 12, 2022

(65) Prior Publication Data
US 2023/0367502 A1 Nov. 16, 2023

(51) Int. Cl.
*G06F 12/00* (2006.01)
*G06F 3/06* (2006.01)

(52) U.S. Cl.
CPC ............. *G06F 3/065* (2013.01); *G06F 3/067* (2013.01); *G06F 3/0619* (2013.01); *G06F 3/0659* (2013.01)

(58) Field of Classification Search
None
See application file for complete search history.

(56) References Cited

U.S. PATENT DOCUMENTS

| | | | |
|---|---|---|---|
| 10,114,691 B2* | 10/2018 | Johri | G06F 11/0793 |
| 2005/0198327 A1* | 9/2005 | Iwamura | H04L 67/1001 |
| | | | 709/225 |
| 2011/0078494 A1* | 3/2011 | Maki | G06F 11/2028 |
| | | | 711/E12.001 |

* cited by examiner

*Primary Examiner* — Daniel D Tsui
(74) *Attorney, Agent, or Firm* — Procopio, Cory, Hargreaves & Savitch LLP

(57) ABSTRACT

While a connection between a copy pair comprising a primary volume in a first storage system associated with a primary host and a secondary volume in a second storage system associated with a secondary host is disconnected, systems and methods described herein can involve changing a state of the copy pair for each of the primary volume and the secondary volume to a temporary suspended state; detecting whether a network connection has recovered; for the detecting indicative of the network connection having recovered, changing the state of the copy pair for the each of the primary volume and the secondary volume to a copy pair state; and for the detecting indicative of the network connection not being recovered after a threshold period of time has elapsed, changing the state of the copy pair for the each of the primary volume and the secondary volume to a suspended state.

16 Claims, 13 Drawing Sheets

| Volume# 101-1-1 | Attribution 101-1-2 | Pair Storage# 101-1-3 | Pair Volume# 101-1-4 | Quorum ID 101-1-6 | Quorum LBA 101-1-7 | Pair State 101-1-8 | Change Time 101-1-9 |
|---|---|---|---|---|---|---|---|
| 1 | Primary | 2 | 3 | 943...ed6 | 0 | PAIR | 8:50:10 |
| 2 | - | - | - | - | - | - | - |
| 3 | Primary | 2 | 5 | 943...ed6 | 2 | PSUS-P | 10:30:20 |
| 4 | Primary | 2 | 4 | 943...ed6 | 1 | COPY | 7:20:30 |
| 5 | - | - | - | - | - | SMPL | 6:30:20 |
| Volume/Pair Management 101-1a | | | | | | | |

Storage Device 100a

| Volume# 101-1-1 | Attribution 101-1-2 | Pair Storage# 101-1-3 | Pair Volume# 101-1-4 | Quorum ID 101-1-6 | Quorum LBA 101-1-7 | Pair State 101-1-8 | Change Time 101-1-9 |
|---|---|---|---|---|---|---|---|
| 1 | - | - | - | - | - | - | - |
| 2 | - | - | - | - | - | SMPL | SMPL |
| 3 | Secondary | 1 | 1 | 943...ed6 | 0 | PAIR | 8:50:10 |
| 4 | Secondary | 1 | 4 | 943...ed6 | 1 | COPY | 7:20:30 |
| 5 | Secondary | 1 | 3 | 943...ed6 | 2 | SSUS-P | 10:30:20 |
| Volume/Pair Management 101-1b | | | | | | | |

Storage Device 100b

FIG. 3

RECOVERY METHOD OF REMOTE COPY

BACKGROUND

Field

The present disclosure is directed to storage systems, and more specifically, to state transition control for synchronous and asynchronous remote copy which have automated failover.

Prior Art

Generally, important data is stored redundantly between remote locations to avoid loss against disasters such as fire, waterflood, earthquake, and terrorism. Storage devices provide features known as "storage remote copy", which copies data between paired storage volumes and maintains data consistency when a data write operation from a host computer occurs.

The storage remote copy feature is categorized into synchronous storage remote copy and asynchronous remote copy. In synchronous remote copy, there is a technique known as "remote copy virtualization" that synchronizes data between two storage devices or volumes between locations, and recognizes them as the same to the host by making their identifiers (IDs) the same. In this technique, both volumes that are to be replicated must be accessible.

When a network disruption or storage device failure is detected, the applications can be resumed with minimal downtime by automatically taking over the applications and the volumes to the surviving site. To achieve this control, related art implementations manage the state of volume pairs that establish remote copy configuration according to the progress of the copy process, the failure occurrence, and device recovery.

SUMMARY

Traditionally, such functions have been used in environments where a stable power supply and a stable network are presumed. Therefore, when a network or device failure are suspected, such implementations immediately purge the suspected area and continue operations.

However, there are many areas where it is difficult to expect such stable power and network infrastructures. Even in such regions, there are calls for the use of the functions above in order to enhance the continuity of applications.

Example implementations described herein are directed to systems and methods that continue the remote copy if it detects a recovery from network disconnection occurring within a short period of time. When a state transition occurs due to a network disconnection, the system will check whether recovery has not occurred for a certain period of time, and if recovery is confirmed, it will resume data redundancy between volumes. On the other hand, if no recovery is confirmed within a certain period of time, suspend and failover processes are performed as before.

Aspects of the present disclosure can involve a method, which can involve, while a connection between a copy pair comprising a primary volume in a first storage system associated with a primary host and a secondary volume in a second storage system associated with a secondary host is disconnected, changing a state of the copy pair for each of the primary volume and the secondary volume to a temporary suspended state; detecting whether a network connection has recovered; for the detecting indicative of the network connection having recovered, changing the state of the copy pair for the each of the primary volume and the secondary volume to a copy pair state; and for the detecting indicative of the network connection not being recovered after a threshold period of time has elapsed, changing the state of the copy pair for the each of the primary volume and the secondary volume to a suspended state.

Aspects of the present disclosure can involve computer instructions, which can involve, while a connection between a copy pair comprising a primary volume in a first storage system associated with a primary host and a secondary volume in a second storage system associated with a secondary host is disconnected, changing a state of the copy pair for each of the primary volume and the secondary volume to a temporary suspended state; detecting whether a network connection has recovered; for the detecting indicative of the network connection having recovered, changing the state of the copy pair for the each of the primary volume and the secondary volume to a copy pair state; and for the detecting indicative of the network connection not being recovered after a threshold period of time has elapsed, changing the state of the copy pair for the each of the primary volume and the secondary volume to a suspended state. The computer instructions can be stored in a non-transitory computer readable medium and executed by one or more processors.

Aspects of the present disclosure can involve a system, which can involve, while a connection between a copy pair comprising a primary volume in a first storage system associated with a primary host and a secondary volume in a second storage system associated with a secondary host is disconnected, means for changing a state of the copy pair for each of the primary volume and the secondary volume to a temporary suspended state; means for detecting whether a network connection has recovered; for the detecting indicative of the network connection having recovered, means for changing the state of the copy pair for the each of the primary volume and the secondary volume to a copy pair state; and for the detecting indicative of the network connection not being recovered after a threshold period of time has elapsed, means for changing the state of the copy pair for the each of the primary volume and the secondary volume to a suspended state.

Aspects of the present disclosure can involve an apparatus, which can include a processor, configured to, while a connection between a copy pair comprising a primary volume in a first storage system associated with a primary host and a secondary volume in a second storage system associated with a secondary host is disconnected, change a state of the copy pair for each of the primary volume and the secondary volume to a temporary suspended state; detect whether a network connection has recovered; for the detecting indicative of the network connection having recovered, change the state of the copy pair for the each of the primary volume and the secondary volume to a copy pair state; and for the detecting indicative of the network connection not being recovered after a threshold period of time has elapsed, change the state of the copy pair for the each of the primary volume and the secondary volume to a suspended state.

Through the example implementations described herein, in an unstable network environment, redundancy can be maintained even in the event of a brief network outage, thereby increasing availability.

BRIEF DESCRIPTION OF DRAWINGS

FIG. 3 is an illustration of an example of the Volume/Pair Management Tables.

DETAILED DESCRIPTION

Figure 1:
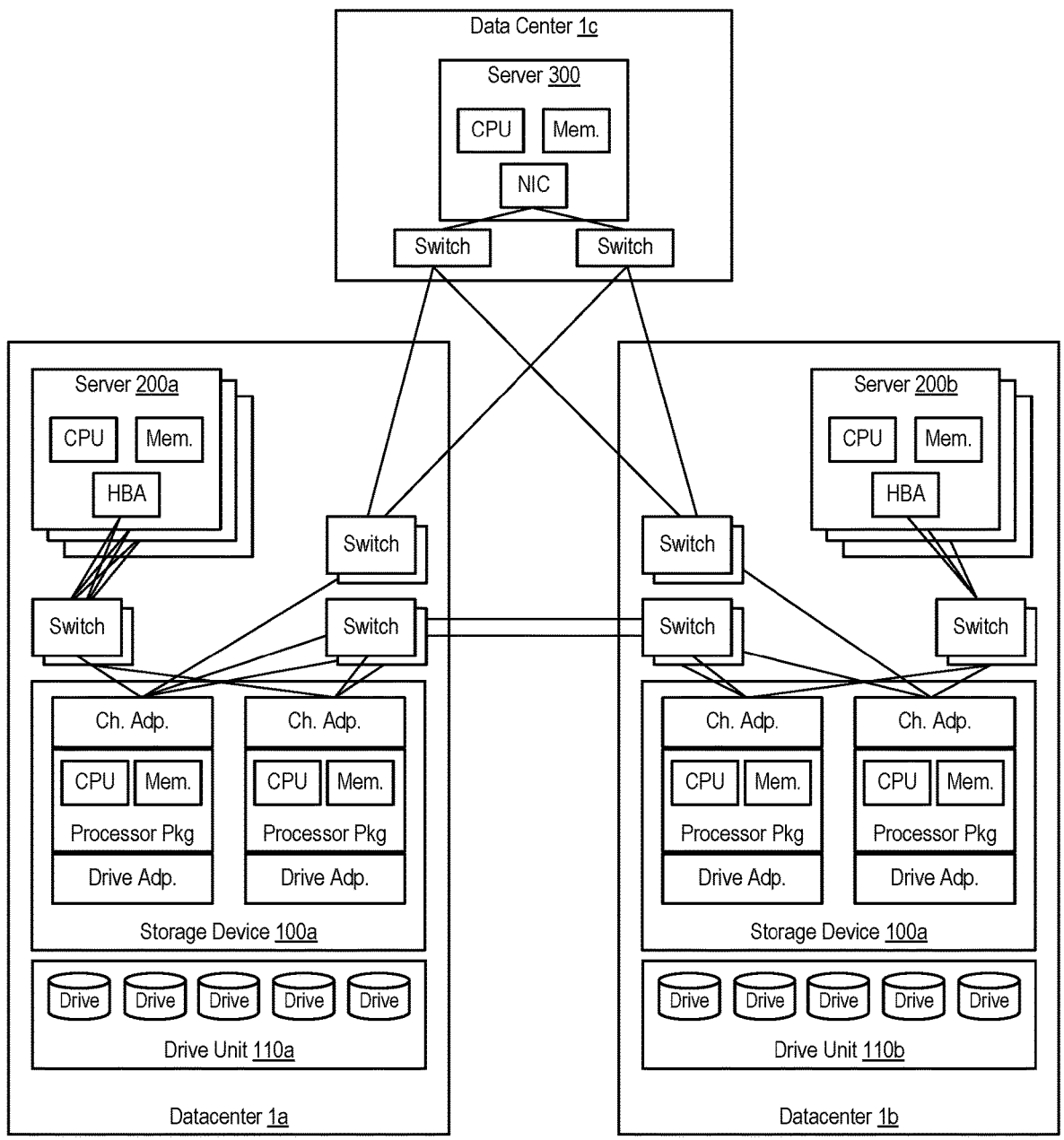
FIG. 1 is an illustration of a physical configuration of a high available system using synchronous storage remote copy.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

FIG. 1 illustrates a physical configuration of a high available system using synchronous storage remote copy, in accordance with an example implementation. In the example of FIG. 1, there are three data centers: Data Center 1a, Data Center 1b, and Data Center 1c, however, the present disclosure is not limited thereto. Example implementations can use asynchronous remote copy instead of synchronous remote copy.

Data Center 1a includes a storage device such as Storage Device 100a. Storage Device 100a includes channel adapter(s) to connect to servers, drive adapter(s) to connect to Drive Unit 110a, central processing unit(s) (CPU(s)) to control the device, and memory(s) to store cache data and control information. Drive Unit 110a stores drives. Storage servers can include servers such as Server 200a. Server 200a includes CPU, Memory and HBA (Host Bus Adapter). Network switches connect Server 200a and Storage Device 100a.

Data Center 1b includes a storage device such as Storage Device 100b. Storage Device 100b includes channel adapter(s) to connect to servers, drive adapter(s) to connect to Drive Unit 110b, CPU(s) to control the device, and memory(s) to store cache data and control information. Drive Unit 110b stores drives. Storage servers can include Server 200b. Server 200b includes CPU, memory and HBA (Host Bus Adapter). Network switches connect Server 200b and Storage Device 100b.

Data Center 1c includes a server such as Server 300. Server 300 includes CPU, memory and NIC (Network Interface Card). Storage Device 100a, Storage Device 100b, and Server 300 are connected by network switches.

As will be described herein, the CPU of the storage devices 100a, 100b can be configured to execute a method or computer instructions involving, while a connection between a copy pair comprising a primary volume in a first storage system associated with a primary host and a secondary volume in a second storage system associated with a secondary host is disconnected, changing a state of the copy pair for each of the primary volume and the secondary volume to a temporary suspended state; detecting whether a network connection has recovered; for the detecting indicative of the network connection having recovered, changing the state of the copy pair for the each of the primary volume and the secondary volume to a copy pair state; and for the detecting indicative of the network connection not being recovered after a threshold period of time has elapsed, changing the state of the copy pair for the each of the primary volume and the secondary volume to a suspended state as illustrated with respect to the flow of FIG. 5.

As will be described herein with respect to the resynchronization and reverse resynchronization relationship of FIG. 5, the CPU of the storage devices 100a, 100b can be configured to execute a method or computer instructions involving, for the state of the copy pair for the each of the primary volume and the secondary volume changing to the suspended state, executing a failover process involving executing a resynchronize operation on the primary volume to change the state of the copy pair of the primary volume to the copy pair state; and for the state of the copy pair of the primary volume remaining in the suspended state after another period of time after the execution of the resynchronize operation, executing a reverse resynchronize operation on the secondary volume to change the state of the copy pair of the secondary volume to the copy pair state. Depending on the desired implementation, for a completion of the resynchoronize operation or the reverse resynchronize operation, such methods and instructions can further include changing an Asymmetric Logical Unit Access (ALUA) setting from standby to available.

Figure 13:
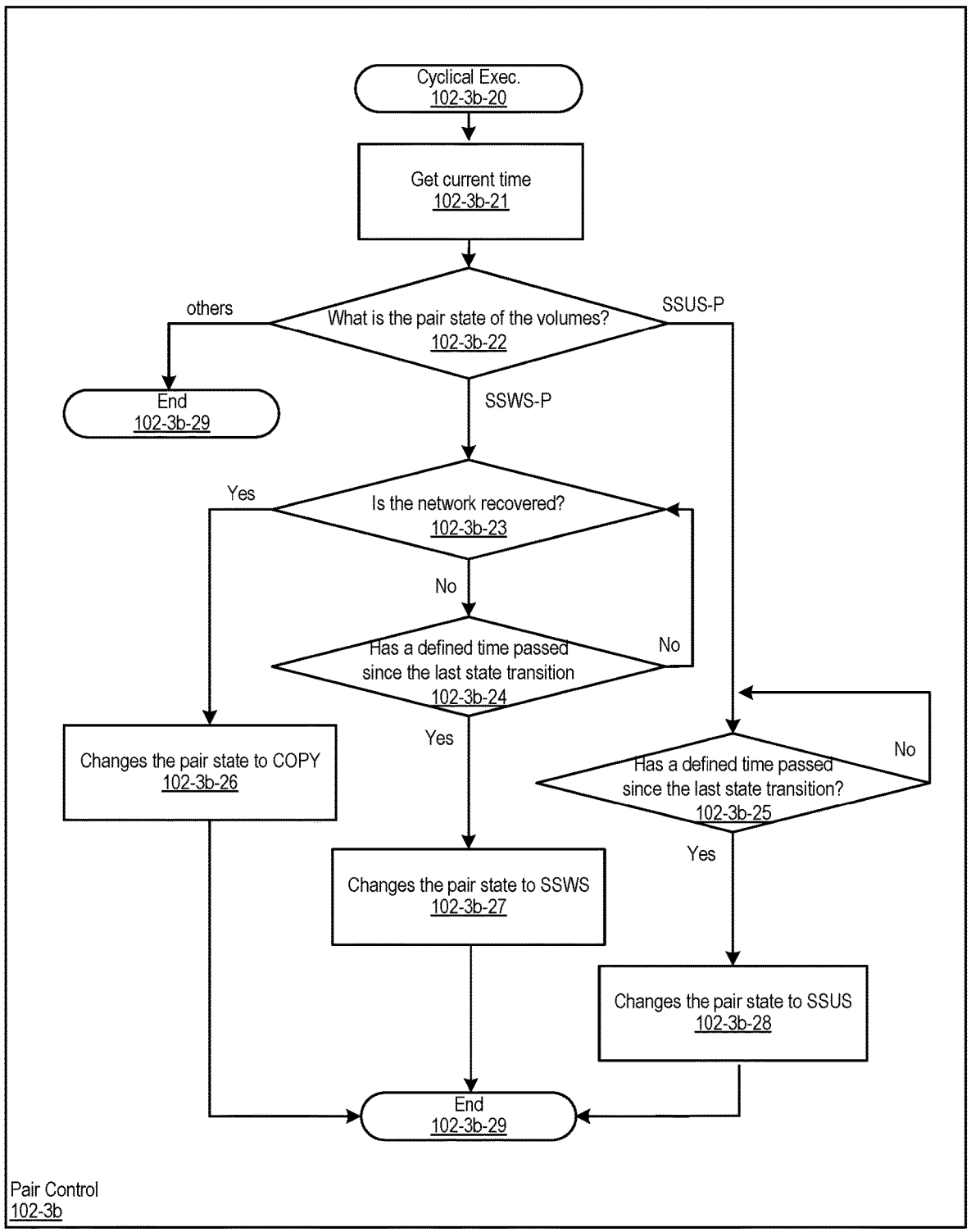
FIG. 13 is an illustration of the flow in Pair Control 102-3b for the primary volume.

As will be described herein, the CPU of the storage devices 100a, 100b can be configured to execute a method or computer instructions involving, while a connection between a copy pair comprising a primary volume in a first storage system associated with a primary host and a secondary volume in a second storage system associated with a secondary host is disconnected storing information indicating that a suspension (PSUS, SSUS) or failover (PSWS, SSWS) occurred due to write redundancy failure as illustrated in FIG. 3. As illustrated in FIG. 13, for the information indicative of the occurrence of the suspension of the copy pair, the CPU of the storage devices 100a, 100b can be configured to execute a method or computer instructions involving executing a resynchronize operation for a threshold period of time, and for a completion of the resynchoronize operation, changing an Asymmetric Logical Unit Access (ALUA) setting from standby to available. Similarly, as illustrated in FIG. 13, for the information indicative of the occurrence of the failover of the copy pair, executing a reverse resynchronize operation for a threshold period of time, and for a completion of the reverse resynchoronize operation, changing an Asymmetric Logical Unit Access (ALUA) setting from standby to available.

Figure 6:
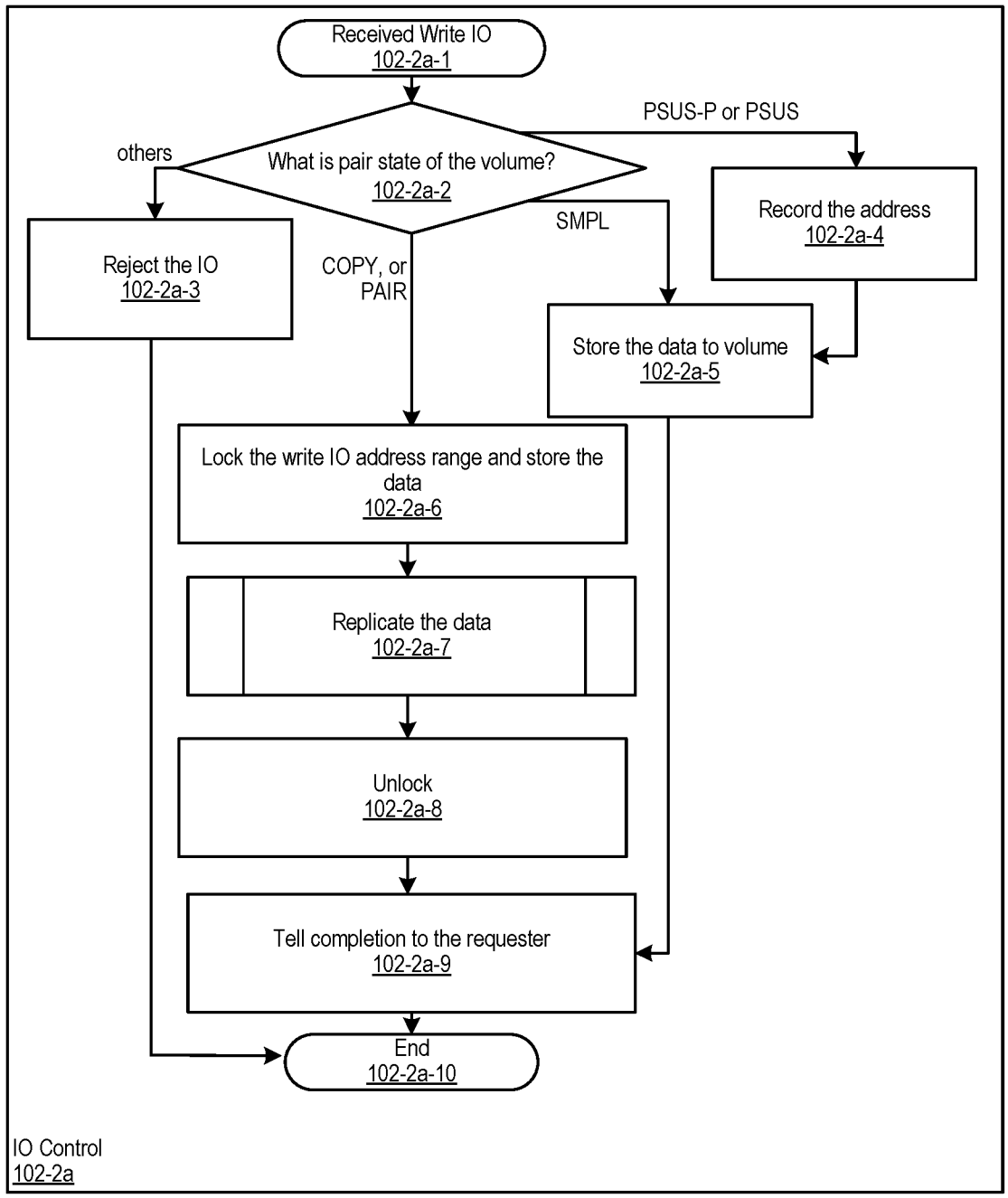
FIG. 6 is an illustration of the flow of IO Control 102-2a when a write IO is received on the primary volume.
Figure 7:
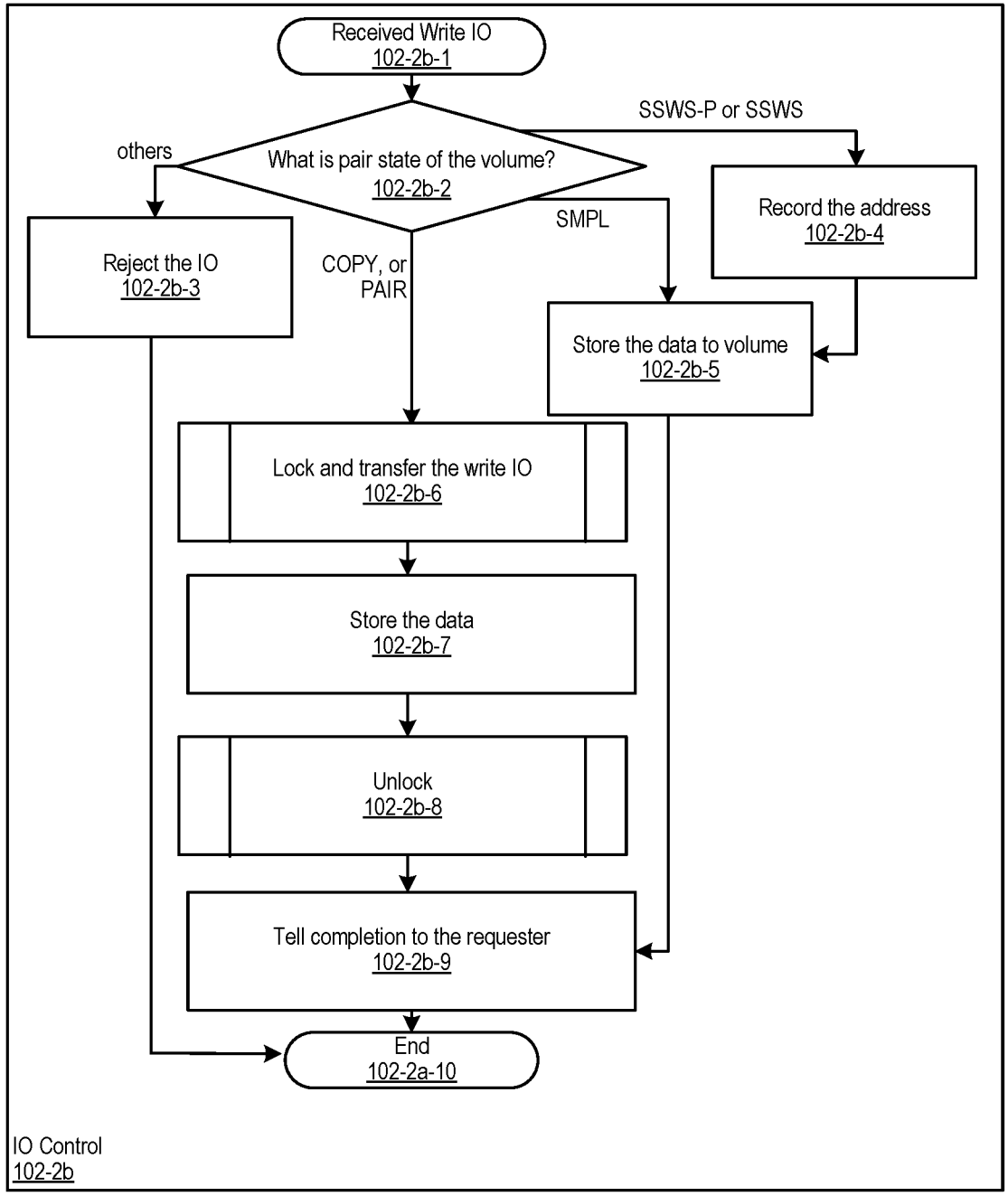
FIG. 7 is an illustration of the flow of IO Control 102-2b when a write IO is received on the secondary volume.

As will be described herein with respect to the handling of write IO during the temporary suspended state as illustrated in FIGS. 6 and 7, the CPU of the storage devices 100a, 100b can be configured to execute a method or computer instructions involving, for receipt of write data to the primary volume during the temporary suspended state, storing a write address of the primary volume and the write data to memory; and for receipt of write data to the secondary volume during the temporary suspended state, storing a write address of the secondary volume and the write data to memory.

Depending on the desired implementation, the copy pair of the primary volume and the secondary volume can be an asynchronous remote copy pair configured to use an asynchronous remote copy failover process as is known in the art to handle the failover. Other failover techniques as known in the art can also be utilized in accordance with the desired implementation, and the present disclosure is not particularly limited thereto.

Example implementations further address the issues of the related art by storing information indicating that the suspension or failover occurred due to a write redundancy (e.g., replication) failure. In such example implementations, when a suspension is performed, a resync operation is attempted for a certain period of time. When a failover has occurred, a reverse resync operation is attempted for a certain period of time. Further, when the resync/reverse resync operation is performed, the unit access will send a notification indicating that the asymmetric logical unit access setting has been changed (e.g., from standby to available/opt).

In example implementations described herein, the suspend operation is the process of separating the pair (e.g., stopping data duplication between the primary and secondary volumes and prohibiting access to the secondary volume) so that the primary site can take control and continue operations at the primary site in the event of a secondary site failure or a network failure.

In example implementations described herein, the failover operation is the process of separating the pair (e.g., stopping data duplication between the primary and secondary volumes and prohibiting access to the primary volume) so that the secondary site can take control and continue operations at the secondary site in the event of a primary site failure or a network failure.

In example implementations described herein, the resync refers to the operation to duplicate the data in the primary volume to the secondary volume in the state where the aforementioned suspend operation has occurred, so as to resume duplication between the two volumes, as well as to allow access to the secondary volume.

In example implementations described herein, the reverse resync operation refers to an operation in which the attributes of the primary and secondary volumes are swapped while the failover process has occurred. The data of the new primary volume is replicated to the new secondary volume. Duplication between the two volumes is resumed, and access to the new secondary volume is enabled.

Figure 2:
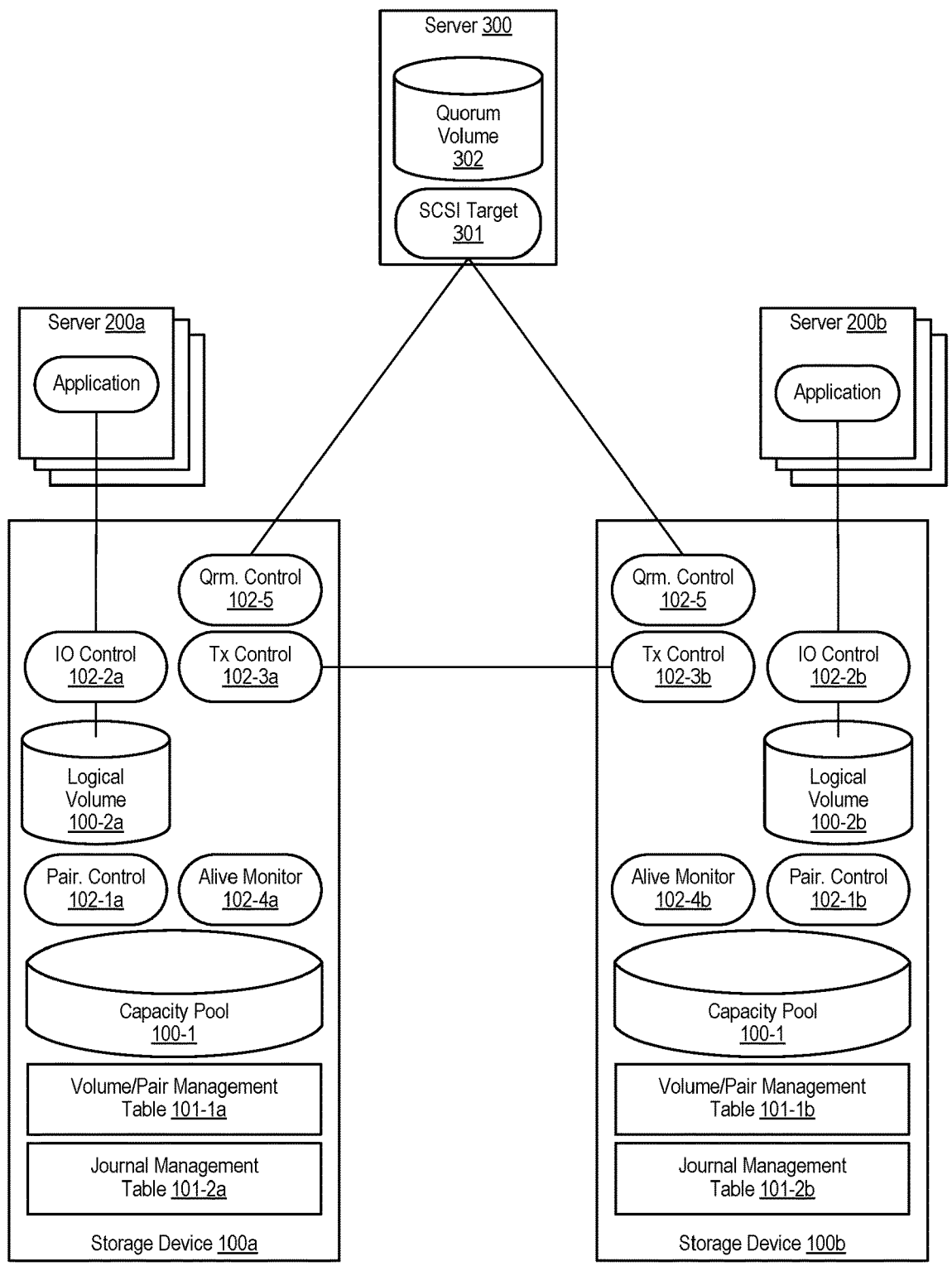
FIG. 2 is an illustration of an example logical configuration of the high available system using asynchronous storage remote copy

FIG. 2 illustrates an example logical configuration of the high available system using asynchronous storage remote copy, in accordance with an example implementation. Each control program is executed by the device CPU. Each management table is stored in memory and used by the device CPU. Each logical object is provided by the CPU from using the control program and the management table.

In the example implementation of FIG. 2, the remote copy feature uses two storage devices and one quorum device. The stored data are replicated in the two storage devices. When the replication between the storage devices has failed, the remote copy feature tries to suspend or take over the volume access. At this time, it may not be possible to determine whether it is a network outage or a device outage, and the quorum is used as a tie-breaker for the majority vote regarding which device will take the initiative.

Storage Device 100a includes logical objects. Logical Volume 100-2a receives an Input/Output (TO) command from Server 200a. Server 200a publishes the CDB (Command Descriptor Block) for the IO which includes the LBA (Logical Block Address) to the volume. When receiving the read IO command, the storage device transfers data stored in the drives or the memory. After receiving the write IO command, the storage device stores data to the memory or to the drives. This volume is a primary volume of a remote copy pair formed with Logical Volume 100-2b as described below. Capacity Pool 100-1a provides capacity to store data for logical volumes.

The following control programs can be used in example implementations described herein. Pair Management Control 102-1a controls the pair state which changes on events such as pair operation and failure (e.g., write redundancy/replication failure, network failure, etc.). IO Control 102-2a controls IO behavior of Logical Volume 100-2a (e.g., from a host computer) according to that pair states, such as exclusion and replication. Read or write commands are controlled by IO Control 102-2a. Transferred IO Control 102-3a controls IO behavior of remote replication for Logical Volume 100-2a according to that pair states (e.g., from a paired storage device), such as exclusion and replication. Alive Control 102-4a records alive information of Storage Device 100a and checks alive information of Storage Device 100b stored in Quorum Volume 302.

The following management tables can be utilized in example implementations described herein. The Volume/Pair Management Table 101-1a stores volume attribution, ID of paired volume, pair state, and quorum information to manage logical volumes. Snapshot Management Table 101-2a stores snapshot parent volume, status, attribution, date, and generation. Command List 101-3 contains information on whether or not exclusion is required when a command is issued for a volume that has a remote copy set. This information may be hard-coded into Command Control 102-6a and/or Transferred Command Control 102-7a.

Storage Device 100b includes logical objects. Logical Volume 100-2b receives IO command from Server 200b. Server 200b publishes the CDB (Command Descriptor Block) for the IO which includes the LBA (Logical Block Address) to the volume. When receiving a read IO command, the storage device transfers data stored in the drives or the memory. After receiving a write IO command, the storage device stores data to the memory or drives. This volume is a secondary volume of a remote copy pair formed with Logical Volume 100-2b as described below. Capacity Pool 100-1 provides capacity to store data for logical volumes.

Storage 100b can involve the following control programs. Pair Management Control 102-1b controls the pair state which changes on events such as pair operation and failure (e.g., write redundancy/replication failure, network failure, etc.). IO Control 102-2b controls IO (from a host computer) behavior of Logical Volume 100-2b according to the pair states, such as exclusion and replication. The read or write command is controlled by IO Control 102-2b. Transferred IO Control 102-3b controls IO behavior of remote replication for Logical Volume 100-2b (e.g., from a paired storage device) according to that pair states, such as exclusion and replication. Alive Control 102-4b facilitates access control to record and check the alive information to quorum device. Quorum Control 102-5 facilitates IO to Quorum Volume 302.

Management tables can include Volume/Pair Management Table 101-1b which stores volume attribution, ID of the paired volume, pair state, and quorum information to manage logical volumes. Snapshot Management Table 101-2b stores snapshot parent volume, status, attribution, date, and generation.

Server 300 provides Quorum Volume 302 to record alive information of Storage 100a and 100b. The IO to Quorum Volume 302 is controlled by Small Computer System Interface (SCSI) Target 301.

FIG. 3 illustrates an example of the Volume/Pair Management Table 101-1a and Volume/Pair Management Table 101-1b, in accordance with an example implementation. In example implementations, they both manage the same type of information. Table 101-1a is stored in Storage Device 100a, and table 101-1b is in Storage Device 100b.

Volume Number 101-1-1 is an ID of volume in the storage device. Volume Attribution 101-1-2 stores the attribution of the volume, such as Primary, Secondary, Journal, or -(null). "Primary" indicates that the volume is primary volume of remote copy. "Secondary" indicates that the volume is secondary volume of remote copy. "-(null)" indicates that the volume is not used for remote copy. Pair Storage Number 101-1-3 is an ID of a storage device which a paired volume of the volume is located. Pair Volume Number 101-4 is an ID of a volume in that storage device which the volume paired. Quorum ID 101-1-6 is an ID of the quorum recognized by the storage device and that paired storage device. Quorum LBA 101-1-7 is a logical block address in the quorum device to which the storage and that paired storage device stores the alive information.

Pair State 101-1-8 is indicative of the pair state of the volume. SMPL, COPY, PAIR, PSUS, SSUS, PSWS, SSWS, PSUE, PSUS-P, SSUS-P, PSWS-P, SSWS-P, -(null), state is stored to the Pair State field 101-1-8. Other states can also be utilized in accordance with the desired implementation. The definition of some of the possible states are as follows.
  SMPL: The volume is not part of a pair.
  COPY: The volume is conducting a copy operation between primary and secondary volume.
  PAIR: The volume and that paired volume is synchronizing data if the primary volume data is updated.
  PSUS: The volume is a primary volume of the pair and accepts IO of the data, and the duplication is disabled.
  SSUS: The volume is a secondary volume of that pair and does not accept IO of the data, and the duplication is disabled.
  PSWS: The volume is a primary volume of that pair and does not accept IO of the data, and the duplication is disabled.
  PSUS: The volume is a secondary volume of that pair and accepts IO of the data, and the duplication is disabled.
  PSUS-P: The volume is a primary volume of that pair and accepts IO of the data, the duplication is disabled and the network recovery needs to be checked.
  SSUS-P: The volume is a secondary volume of that pair and does not accept IO of the data, the duplication is disabled, and the network recovery needs to be checked.
  PSWS-P: The volume is a primary volume of that pair and does not accept IO of the data, the duplication is disabled, and the network recovery needs to be checked.
  PSUS-P: The volume is a secondary volume of that pair and accepts IO of that data, the duplication is disabled, and the network recovery needs to be checked.
  PSUE: The volume has a pair, but does not accept IO of that volume.
  -(null): The volume is not used for a logical volume.

Change Time 101-1-9 stores the time which the volume changes that pair state.

Figure 4:
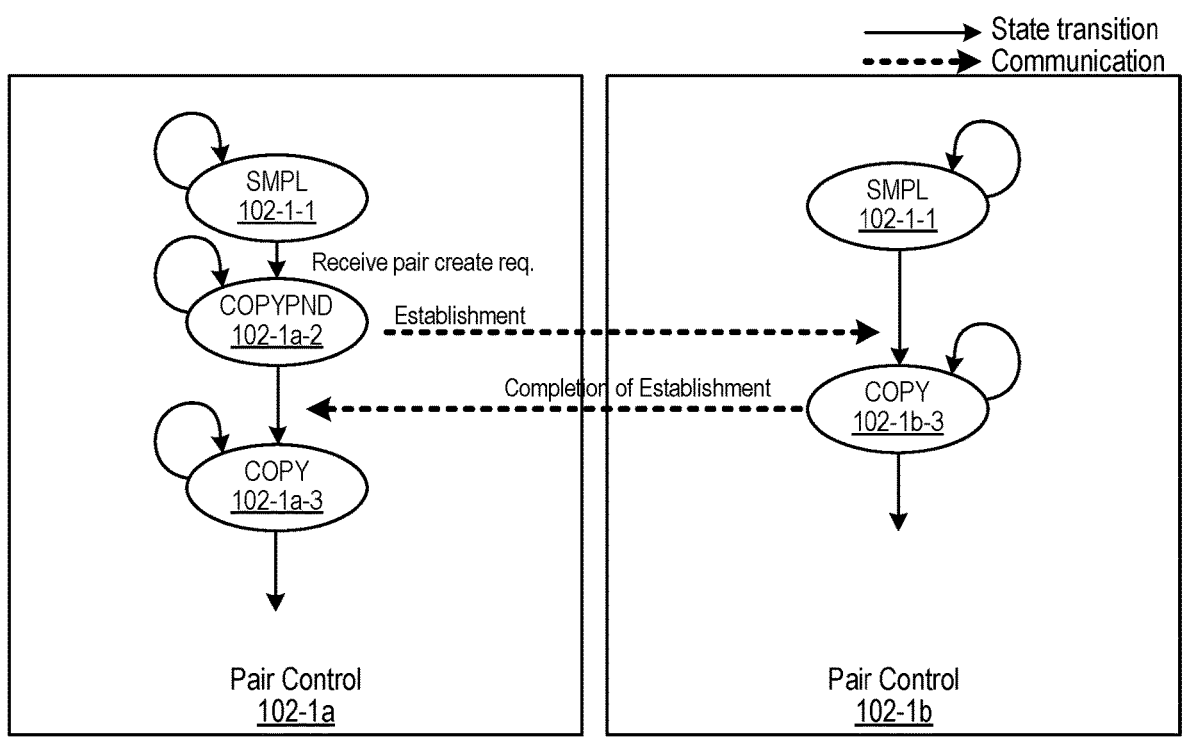
FIG. 4 is an illustration of the processes for Pair Control 102-1a and Pair Control 102-1b, in accordance with an example implementation.
Figure 5:
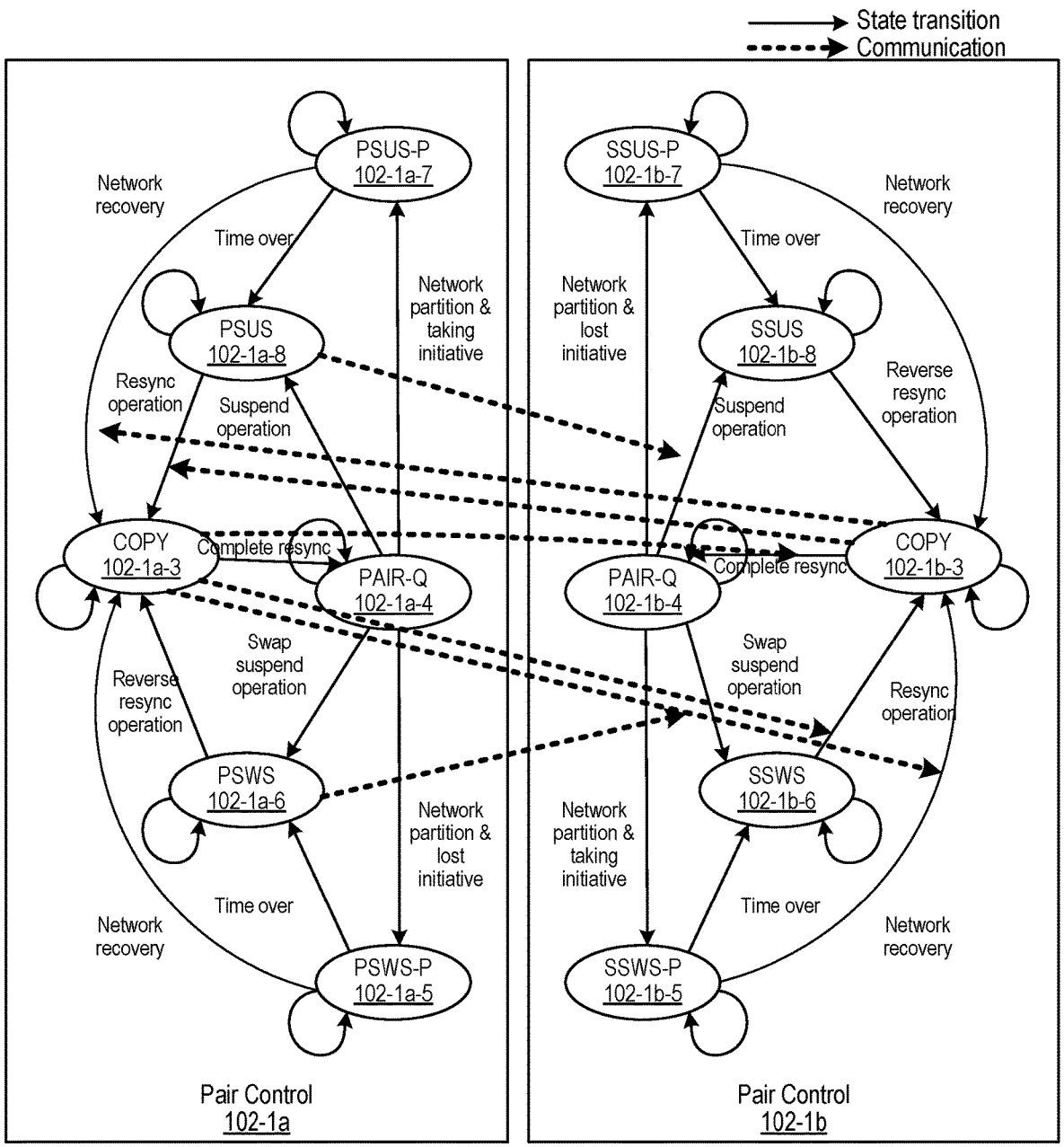
FIG. 5 is an illustration of the processes for Pair Control 102-1a and Pair Control 102-1b, in accordance with an example implementation.

FIGS. 4 and 5 illustrate the processes for Pair Control 102-1a and Pair Control 102-1b, in accordance with an example implementation. The control is based on the state machine of the volume pair, such as the information stored in Pair State 101-1-8. In the example of FIGS. 4 and 5, the solid lines show state transition and the dashed lines show a communication message when the transition occurs.

When a primary and secondary volume is not an established pair, the state of both are SMPL 102-1-1. When a storage device receives a command to establish a pair on SMPL 102-1-1 state, the state of the primary volume becomes COPYPND 102-1a-2 and then the storage device sends an "Establishment" message to that pair.

When a storage device receives the "Establishment" message on SMPL 102-1-1 state, the state of the secondary volume becomes COPY 102-1b-3, wherein that storage returns a "Completion of Establishment" message, and the secondary volume starts to copy from that primary volume to the secondary volume.

When a storage device receives the "Completion of Establishment" on COPYEND 102-1a-2, the state of the primary volume becomes COPY 102-1a-3 and replicates that volume to the paired volume.

When a storage device finishes replication on COPY 102-1a-3 state, the state of the primary volume becomes PAIR 102-1a-4 and sends the "Completion of Resync" message to that pair. When a storage device receives the "Completion of Resync" message on COPY 102-1b-3 state, becomes PAIR 102-1b-4.

When a storage receives suspend operation on PAIR 1-2-1-4, the state of the primary volume becomes PSUS 102-1a-8 and sends the "Suspend" message to that pair. When a storage device receives the "Suspend" message on PAIR 102-1b-4, the state becomes SSUS 102-1b-8.

When a storage receives swap suspend operation on PAIR 102-1a-4, the state of the primary volume becomes PSWS 102-1a-6 and sends the "Swap Suspend" message to that pair. When a storage device receives the "Suspend" message on PAIR 102-1b-4, becomes SSWS 102-1b-6.

When a storage finds a network partition and gets the initiative on PAIR 102-1a-4, the state of the primary volume becomes PSUS-P 102-1a-6. In this case, the paired volume finds network partition but does not get the initiative on PAIR 102-1b-4, so it becomes SSUS-P 102-1b-8.

When a storage finds a network partition and gets the initiative on PAIR 102-1b-4, the state of the secondary volume becomes SSWS-P 102-1b-6. In this case, the paired volume finds network partition but does not get initiative on PAIR 102-1a-4, it becomes PSWS-P 102-1a-8.

When a storage finds network recovery within a defined term on PSUS-P 102-1a-7, the state of the primary volume becomes COPY 102-1a-3. If the defined term is over on PSUS-P 102-1a-7, it becomes PSUS 102-1a-8.

When a storage finds network recovery within a defined term on PSUS-P 102-1b-5, the state of the secondary volume becomes COPY 102-1b-3. If the defined term is over on SSWS-P 102-1b-5, it becomes SSWS 102-1b-6.

When a storage receives "Resync" message within a defined term on SSUS-P 102-1b-7, the state of the secondary volume becomes COPY 102-1b-3. If the defined term is over on PSUS-P 102-1a-7, it becomes SSUS 102-1b-8.

When a storage receives "Swap Resync" message within a defined term on PSWS-P 102-1a-5, the state of the primary volume becomes COPY 102-1a-3. If the defined term is over on PSWS-P 102-1a-5, it becomes PSWS 102-1a-6.

In these state transitions, ALUA (Asymmetric Logical Unit Access) functions may be used to control the path so that communication between the local host and storage is prioritized.

FIG. 6 illustrates the flow of IO Control 102-2a when a write IO is received on the primary volume. At SMPL, it stores the write IO data without doing anything special. At PSUS or PSUS-P, it stores the write IO data with recording the differences. At COPY or PAIR, it stores the write IO data with replication to the paired volume. At others, it does not store the write IO data.

At step 102-2a-1, the flow wakes up when a write IO is received.

At step 102-2a-2, the flow checks a pair state of the volume. If the state is PSUS or PSUS-P, then the flow proceeds to 102-2a-4. If the state is SMPL, the flow proceeds to 102-2a-5. If the state is COPY or PAIR, the flow proceeds to 102-2a-6. On other cases, the flow processed to 102-2a-3.

At step 102-2a-3, the flow sends reject message to the host, and proceeds to step 102-2a-10. At step 102-2a-4, the flow records that write address to the memory, and proceeds to step 102-2a-5. At step 102-2a-5, the flow stores the write IO data, and proceeds to 102-2a-9. At step 102-2a-6, the flow locks the address range of the write IO, and proceeds to step 102-2a-7. At step 102-2a-7, the flow replicates the write IO data to the pair volume with Transfer Control 102-3a, and proceeds to 102-2a-8. At step 102-2a-8, the flow unlocks the address range of the write IO, and proceeds to step 102-2a-9. At step 102-2a-9, the flow sends the completion message to the host, and proceeds to step 102-2a-10. At step 102-2a-10, the flow terminates IO Control 102-2a.

FIG. 7 illustrates the flow of IO Control 102-2b when a write IO is received on the secondary volume. At SMPL, the flow stores the write IO data without doing anything special. At SSWS or SSWS-P, the flow stores the write IO data by recording the differences. At COPY or PAIR, the flow stores the write IO data with replication to the paired volume. At others, the flow rejects and does not store the write IO data.

At step 102-2b-1, the flow wakes up when a write IO receives. At step 102-2b-2, the flow checks a pair state of the volume. If the state is SSWS or SSWS-P, the flow proceeds to 102-2b-4. If the state is SMPL, the flow proceeds to 102-2b-5. If the state is COPY or PAIR, the flow proceeds to 102-2b-6. On other cases, the flow proceeds to 102-2b-3.

At step 102-2b-3, the flow sends a reject message to the host, and proceeds to step 102-2b-10. At step 102-2b-4, the flow records that write address to the memory, and proceeds to step 102-2b-5. At step 102-2b-5, the flow stores the write IO data, and proceeds to 102-2b-9.

At step 102-2b-6, the flow requests to locks the address range of the write IO and stores the write data to pair volume with Transfer Control 102-3b, and proceeds to step 102-2b-7. At step 102-2b-7, the flow stores the write IO data.

At step 102-2b-8, the flow requests to unlock the address range of the write IO to pair volume with Transfer Control 102-3b, and proceeds to step 102-2b-9. At step 102-2b-9, the flow sends completion message to the host, and proceeds to step 102-2b-10. At step 102-2b-10, the flow terminates IO Control 102-2b.

Figure 8:
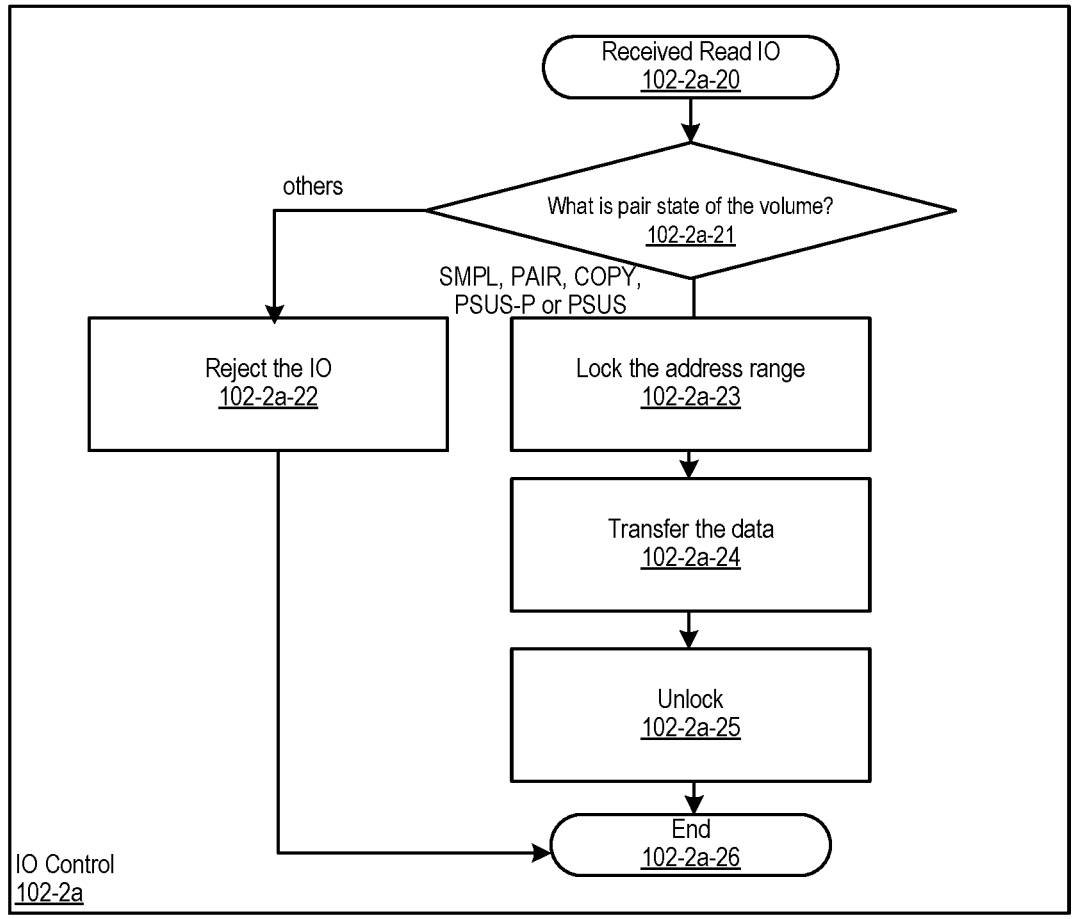
FIG. 8 is an illustration of the flow of IO Control 102-2a when a read IO is received on the primary volume.

FIG. 8 illustrates the flow of IO Control 102-2a when a read IO is received on the primary volume. At SMPL, PSUS, PSUS-P, PAIR, or COPY, the flow returns the data. For other states, the flow rejects the read IO.

At step 102-2a-20, the flow wakes up when a read IO is received. At step 102-2a-21, the flow checks a pair state of the volume. If the state is SMPL, PSUS, PSUS-P, PAIR, or COPY, the flow proceeds to 102-2a-23. On other cases, the flow proceeds to 102-2a-23.

At step 102-2b-22, the flow sends a reject message to the host, and proceeds to step 102-2a-26. At step 102-2a-23, the flow locks the address range of the read IO, and proceeds to step 102-2a-24. At step 102-2a-24, the flow sends data to the host and proceeds to 102-2a-25. At step 102-2a-25, the flow unlocks the address range of the read TO, and proceeds to step 102-2a-26. At step 102-2a-26, the flow terminates IO Control 102-2a.

Figure 9:
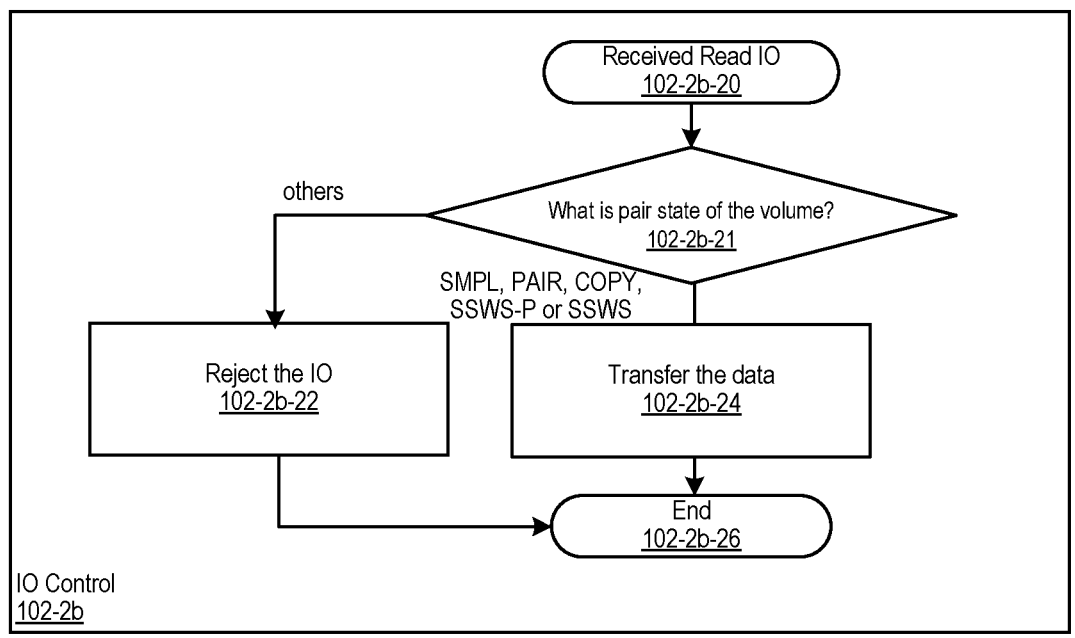
FIG. 9 is an illustration of the flow of IO Control 102-2b when a read IO is received on the primary volume.

FIG. 9 illustrates the flow of IO Control 102-2b when a read IO is received on the primary volume. At SMPL, SSWS, SSWS-P, PAIR, or COPY, the flow returns the data. At others, the flow rejects the read IO. At step 102-2b-20, the flow wakes up when a read IO is received.

At step 102-2b-21, the flow checks a pair state of the volume. If the state is SMPL, SSWS, SSWS-P, PAIR, or COPY, the flow proceeds to 102-2b-23. On other cases, the flow proceeds to 102-2b-24.

At step 102-2b-22, the flow sends a reject message to the host, and proceeds to step 102-2b-26. At step 102-2b-24, the flow sends data to the host and proceeds to 102-2b-26. At step 102-2b-26, the flow terminates IO Control 102-2b.

Figure 10:
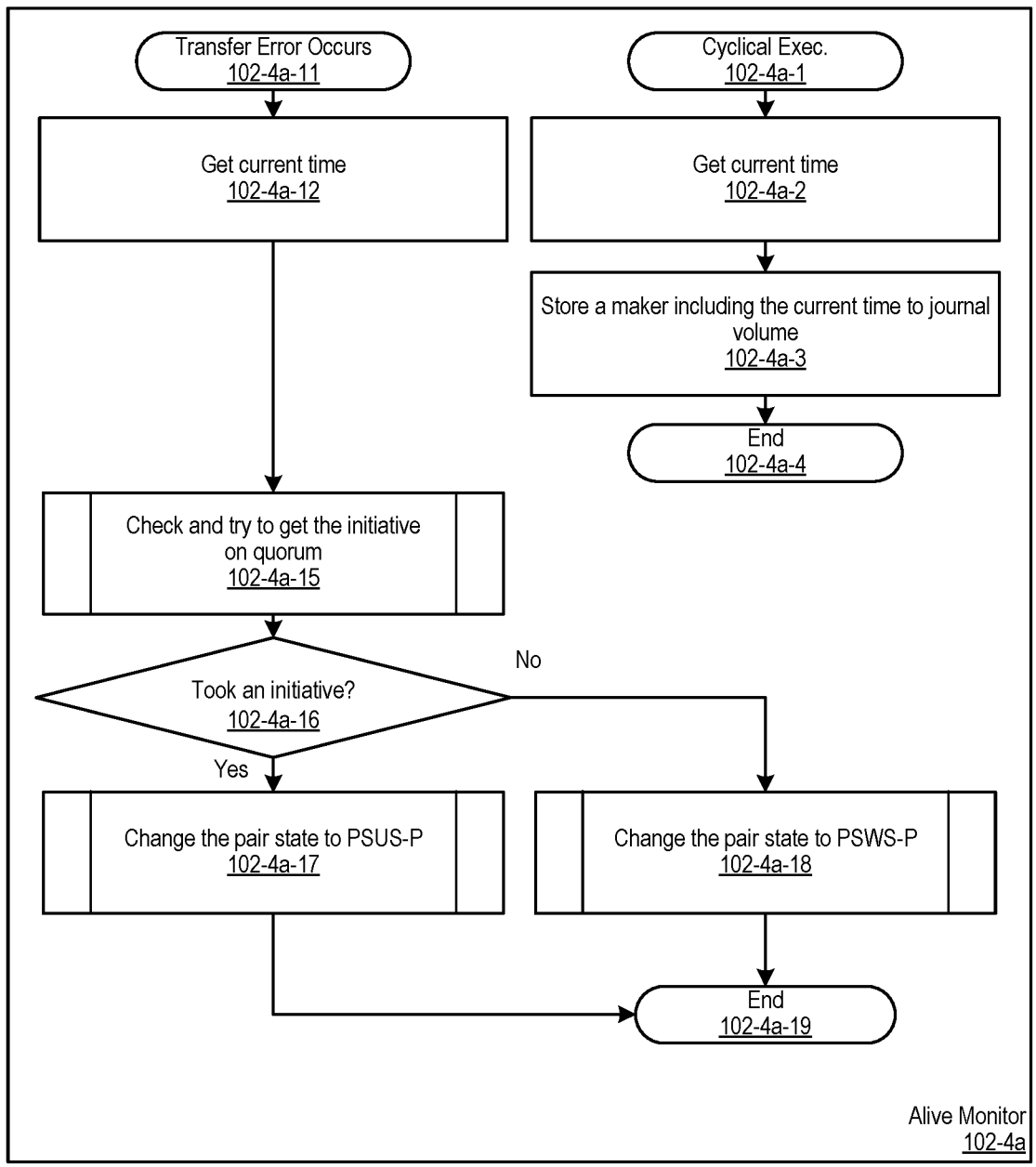
FIG. 10 is an illustration of the flows in Alive Monitor 102-4a for the primary volume.

FIG. 10 illustrates the flows in Alive Monitor 102-4a for the primary volume. The program wakes up cyclically or when a network error occurs on Transfer Control 102-3a. At 102-4a-1, the flow is executed cyclically and proceeds to 102-4a-2. At 102-4a-2, the flow gets the current time, and proceeds to 102-4a-3. At 102-4a-3, the flow stores the time as alive information to the related quorum volume managed by Volume/Pair Management Table 101-1a, and proceeds to 102-4a-4. At step 102-4a-4, the flow terminates the program.

At 102-4a-11, the flow is executed when a network error occurs, and proceeds to 102-4a-15. At 102-4a-15, the flow checks the alive information of the pair in the quorum volume and attempts to obtain the initiative, and proceeds to step 102-4a-16. At 102-4a-16, if the program is successful in taking the initiative, the flow proceeds to step 102-4a-17, otherwise the flow proceeds to step 102-4a-18.

At 102-4a-17, the flow changes the pair state to PSUS-P with Pair Control 102-1a, and proceeds to step 102-4a-19. At 102-4a-18, the flow changes the pair state to PSWS-P with Pair Control 102-1a, and proceeds to step 102-4a-19.

Figure 11:
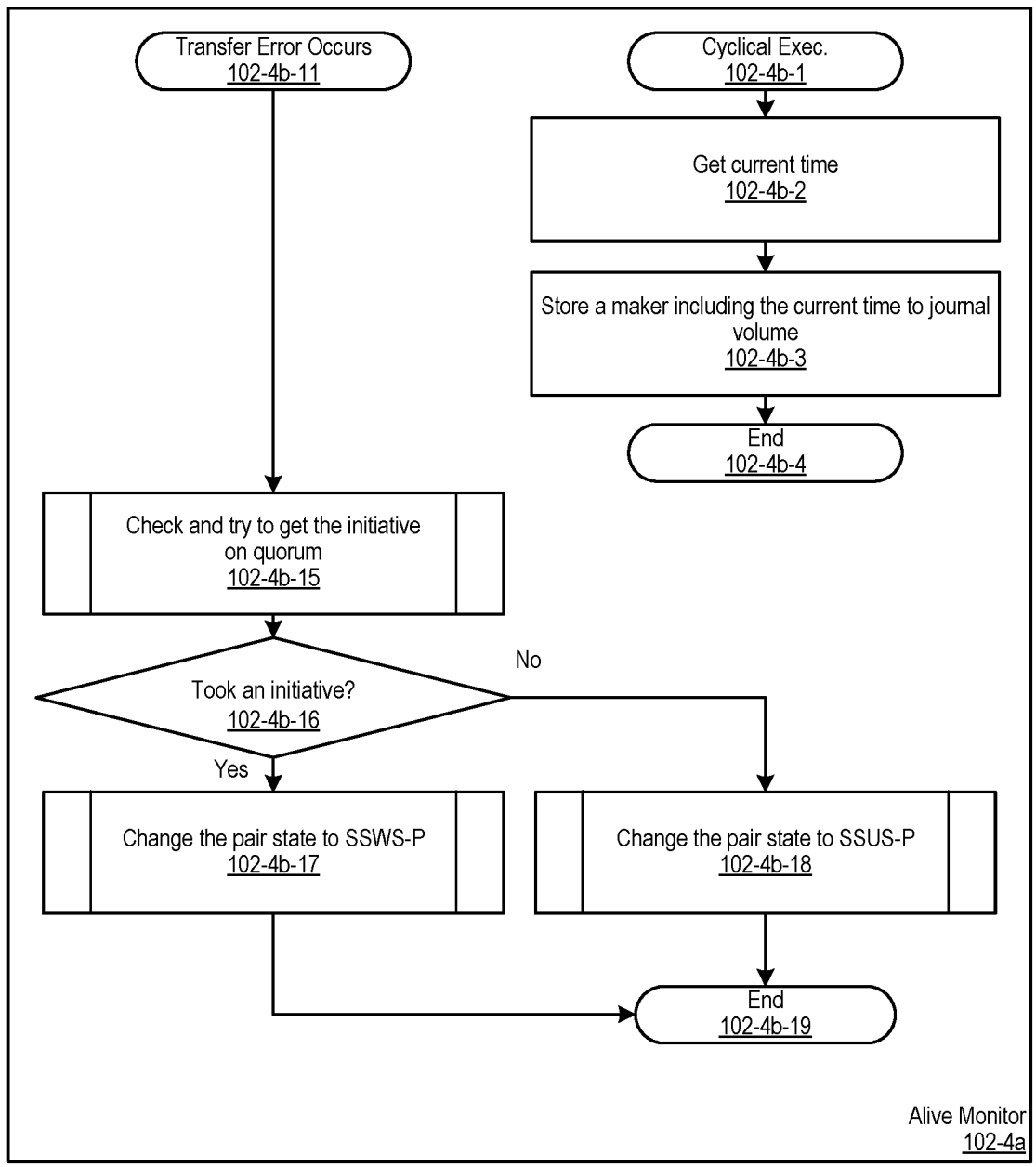
FIG. 11 is an illustration of the flows in Alive Monitor 102-4b for the primary volume.

FIG. 11 illustrates the flows in Alive Monitor 102-4b for the primary volume. The program is executed cyclically or when a network error occurs on Transfer Control 102-3a. At 102-4b-1, the flow is executed cyclically, and proceeds to 102-4b-2. At 102-4b-2, the flow obtains the current time, and proceeds to 102-4b-3. At 102-4b-3, the flow stores the time as alive information to the related quorum volume managed by Volume/Pair Management Table 101-1a, and proceeds to 102-4b-4. At step 102-4b-4, the flow terminates the program.

At 102-4b-11, the flow is executed when a network error occurs, and proceeds to 102-4b-15. At 102-4b-15, the flow checks the alive information of the pair in the quorum volume, attempts to obtain the initiative, and proceeds to step 102-4b-16.

At 102-4b-16, if the program succeeds in taking the initiative, then the flow proceeds to step 102-4b-17, otherwise the flow proceeds to step 102-4b-18. At 102-4b-17, the flow changes the pair state to SSWS-P with Pair Control 102-1a, and proceeds to step 102-4b-19. At 102-4b-18, the flow changes the pair state to SSUS-P with Pair Control 102-1a, and proceeds to step 102-4b-19. At 102-4b-19, the flow terminates.

Figure 12:
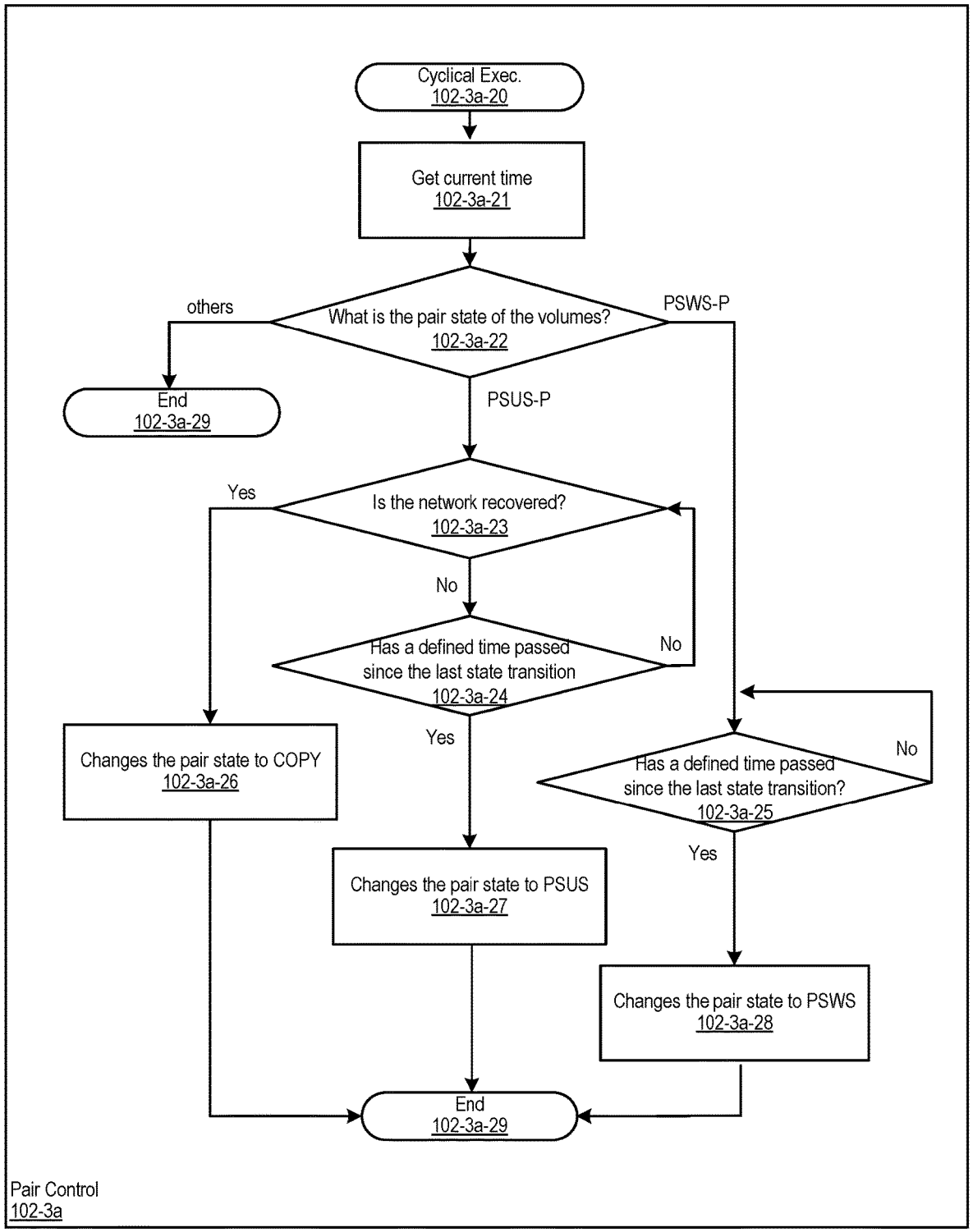
FIG. 12 is an illustration of the flow in Pair Control 102-3a for the primary volume.

FIG. 12 illustrates the flow in Pair Control 102-3a for the primary volume. The program wakes up cyclically.

At 102-3a-20, the flow is executed cyclically, and proceeds to 102-3a-21. At 102-3a-21, the flow obtains the current time, and proceeds to 102-3a-22. At 102-3a-22, the flow checks the pair state. If it is PSUS-P, the flow proceeds to 102-3a-23. If it is PSWS-P, the flow proceeds to 102-3a-25. On other cases, the flow proceeds to 102-3a-29.

At 102-3a-23, the flow checks for a network recovery. If the recovery occurs, the flow proceeds to 102-3a-26, otherwise the flow proceeds to 102-3a-27. At 102-3a-24, it checks elapsed time, if the define term is over, proceeds to step 102-3a-27, else return to step 102-3a-23.

At 102-3a-25, the flow checks the elapsed time. If the defined term is over, then the flow proceeds to step 102-3a-28, else the flow returns to step 102-3a-25. At 102-3a-26, the flow changes the pair state to COPY, and proceeds to step 102-3a-29. At 102-3a-27, the flow changes the pair state to PSUS, and proceeds to step 102-3a-29. At 102-3a-28, the flow changes the pair state to PSWS, and proceeds to step 102-3a-29.

FIG. 13 illustrates the flow in Pair Control 102-3b for the primary volume. The program wakes up cyclically. At 102-3b-20, the flow is cyclically, and proceeds to 102-3b-21. At 102-3b-21, the flow gets the current time, and proceeds to 102-3b-22.

At 102-3b-22, the flow checks that pair state. If the state is SSWS-P, the flow proceeds to 102-3b-23. If the state is SSUS-P, the flow proceeds to 102-3b-25. On other cases, it proceeds to 102-3b-29.

At 102-3b-23, the flow checks for a network recovery, if the recovery occurs, the flow proceeds to 102-3b-26, else the flow proceeds to 102-3b-27.

At 102-3b-24, the flow checks the elapsed time. If the defined term is over, the flow proceeds to step 102-3b-27, else the flow returns to step 102-3b-23.

At 102-3b-25, the flow checks the elapsed time. If the define term is over, the flow proceeds to step 102-3b-28, else the flow returns to step 102-3b-25.

At 102-3b-26, the flow changes the pair state to COPY, and proceeds to step 102-3b-29. At 102-3b-27, the flow changes the pair state to SSWS, and proceeds to step 102-3b-29. At 102-3b-28, the flow changes the pair state to SSUS, and proceeds to step 102-3b-29.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
while a connection between a copy pair comprising a primary volume in a first storage system associated with a primary host and a secondary volume in a second storage system associated with a secondary host is disconnected:
changing a state of the copy pair for each of the primary volume and the secondary volume to a temporary suspended state;
detecting whether a network connection has recovered;
for the detecting indicative of the network connection having recovered, changing the state of the copy pair for the each of the primary volume and the secondary volume to a copy pair state; and
for the detecting indicative of the network connection not being recovered after a threshold period of time has elapsed, changing the state of the copy pair for the each of the primary volume and the secondary volume to a suspended state.

2. The method of claim 1, wherein, for the state of the copy pair for the each of the primary volume and the secondary volume changing to the suspended state, executing a failover process comprising:
executing a resynchronize operation on the primary volume to change the state of the copy pair of the primary volume to the copy pair state; and
for the state of the copy pair of the primary volume remaining in the suspended state after another period of time after the execution of the resynchronize operation, executing a reverse resynchronize operation on the secondary volume to change the state of the copy pair of the secondary volume to the copy pair state.

3. The method of claim 2, wherein for a completion of the resynchoronize operation or the reverse resynchronize operation, changing an Asymmetric Logical Unit Access (ALUA) setting from standby to available.

4. The method of claim 1, further comprising:
for receipt of write data to the primary volume during the temporary suspended state, storing a write address of the primary volume and the write data to memory; and
for receipt of write data to the secondary volume during the temporary suspended state, storing a write address of the secondary volume and the write data to memory.

5. The method of claim 1, wherein the copy pair of the primary volume and the secondary volume is an asynchronous remote copy pair configured to use an asynchronous remote copy failover process.

6. The method of claim 1, wherein, while a connection between a copy pair comprising a primary volume in a first storage system associated with a primary host and a secondary volume in a second storage system associated with a secondary host is disconnected:
storing information indicating that a suspension or failover occurred due to write redundancy failure.

7. The method of claim 6, further comprising, for the information indicative of the occurrence of the suspension of the copy pair:
executing a resynchronize operation for a threshold period of time, and for a completion of the resynchoronize operation, changing an Asymmetric Logical Unit Access (ALUA) setting from standby to available.

8. The method of claim 6, further comprising, for the information indicative of the occurrence of the failover of the copy pair:
executing a reverse resynchronize operation for a threshold period of time, and
for a completion of the reverse resynchoronize operation, changing an Asymmetric Logical Unit Access (ALUA) setting from standby to available.

9. A non-transitory computer readable medium, storing instructions for executing a process on one or more hardware processors, the instructions comprising:
while a connection between a copy pair comprising a primary volume in a first storage system associated with a primary host and a secondary volume in a second storage system associated with a secondary host is disconnected:
changing a state of the copy pair for each of the primary volume and the secondary volume to a temporary suspended state;
detecting whether a network connection has recovered;
for the detecting indicative of the network connection having recovered, changing the state of the copy pair for the each of the primary volume and the secondary volume to a copy pair state; and
for the detecting indicative of the network connection not being recovered after a threshold period of time has elapsed, changing the state of the copy pair for the each of the primary volume and the secondary volume to a suspended state.

10. The non-transitory computer readable medium of claim 6, wherein, for the state of the copy pair for the each of the primary volume and the secondary volume changing to the suspended state, executing a failover process comprising:
executing a resynchronize operation on the primary volume to change the state of the copy pair of the primary volume to the copy pair state; and
for the state of the copy pair of the primary volume remaining in the suspended state after another period of time after the execution of the resynchronize operation, executing a reverse resynchronize operation on the secondary volume to change the state of the copy pair of the secondary volume to the copy pair state.

11. The non-transitory computer readable medium of claim 7, wherein for a completion of the resynchoronize operation or the reverse resynchronize operation, changing an Asymmetric Logical Unit Access (ALUA) setting from standby to available.

12. The non-transitory computer readable medium of claim 6, further comprising:
for receipt of write data to the primary volume during the temporary suspended state, storing a write address of the primary volume and the write data to memory; and
for receipt of write data to the secondary volume during the temporary suspended state, storing a write address of the secondary volume and the write data to memory.

13. The non-transitory computer readable medium of claim 6, wherein the copy pair of the primary volume and the secondary volume is an asynchronous remote copy pair configured to use an asynchronous remote copy failover process.

14. The non-transitory computer readable medium of claim 6, wherein, while a connection between a copy pair comprising a primary volume in a first storage system associated with a primary host and a secondary volume in a second storage system associated with a secondary host is disconnected:
  storing information indicating that a suspension or failover occurred due to write redundancy failure.

15. The non-transitory computer readable medium of claim 14, further comprising, for the information indicative of the occurrence of the suspension of the copy pair:
  executing a resynchronize operation for a threshold period of time, and
  for a completion of the resynchoronize operation, changing an Asymmetric Logical Unit Access (ALUA) setting from standby to available.

16. The non-transitory computer readable medium of claim 14, further comprising, for the information indicative of the occurrence of the failover of the copy pair:
  executing a reverse resynchronize operation for a threshold period of time, and
  for a completion of the reverse resynchoronize operation, changing an Asymmetric Logical Unit Access (ALUA) setting from standby to available.

* * * * *